United States Patent
Kulkarni et al.

(10) Patent No.: US 9,047,134 B2
(45) Date of Patent: Jun. 2, 2015

(54) SYSTEM AND METHOD FOR INCREASING THE CAPABILITIES OF A MOBILE DEVICE

(75) Inventors: Pavan Kumar Kulkarni, Hyderabad (IN); Manoj Vijaykumar Jajoo, Hyderabad (IN); Archana Sachin Ghag, Pune (IN)

(73) Assignee: Infosys Limited, Bangalore (IN)

( * ) Notice: Subject to any disclaimer, the term of this patent is extended or adjusted under 35 U.S.C. 154(b) by 217 days.

(21) Appl. No.: 13/528,801

(22) Filed: Jun. 20, 2012

(65) Prior Publication Data

US 2013/0263126 A1  Oct. 3, 2013

(30) Foreign Application Priority Data

Mar. 27, 2012  (IN) .......................... 1139/CHE/2012

(51) Int. Cl.
G06F 9/455 (2006.01)
G06F 9/50 (2006.01)

(52) U.S. Cl.
CPC .......... *G06F 9/5072* (2013.01); *G06F 9/45533* (2013.01)

(58) Field of Classification Search
None
See application file for complete search history.

(56) References Cited

U.S. PATENT DOCUMENTS

| 8,220,058 B2* | 7/2012 | de Jong .......................... 726/26 |
| 2008/0031196 A1 | 2/2008 | Marathe et al. |
| 2009/0036111 A1* | 2/2009 | Danford et al. ............... 455/419 |
| 2010/0070476 A1* | 3/2010 | O'Keefe et al. ............... 707/640 |
| 2011/0022812 A1 | 1/2011 | van der Linden et al. |
| 2011/0161495 A1 | 6/2011 | Ratering et al. |
| 2011/0225417 A1* | 9/2011 | Maharajh et al. ............. 713/150 |

FOREIGN PATENT DOCUMENTS

| WO | 2010058989 A1 | 5/2010 |
| WO | 2011038352 A1 | 3/2011 |

* cited by examiner

*Primary Examiner* — Kenneth Tang
(74) *Attorney, Agent, or Firm* — Marc S. Kaufman; Stephen M. Hertzler; Reed Smith LLP

(57) ABSTRACT

A system and computer-implemented method for increasing the computational capabilities of a mobile device by initializing one or more virtual machines in cloud computing environment to run applications. The system and computer-implemented method comprising a manager module that stimulates an application on a virtual machine with a user's interactions with a rendered version of the application on a mobile device.

15 Claims, 4 Drawing Sheets

SYSTEM AND METHOD FOR INCREASING THE CAPABILITIES OF A MOBILE DEVICE

RELATED APPLICATION DATA

This application claims priority to India Patent Application No. 1139/CHE/2012, filed Mar. 27, 2012, the entire disclosure of which is hereby incorporated herein by reference in its entirety.

BACKGROUND

In a cloud computing model, users are able to access application services from any location on demand and without regard to where the services are actually hosted. This provisioning of computing services is typically supported by disparately located data centers containing ensembles of networked virtual machines. Cloud computing delivers infrastructure, platform and software as services, which may be made available as subscription based services wherein payment is dependent upon actual usage.

A virtual machine or "VM" is commonly known in the art. A virtual machine may be generally described as software that is capable of executing programs as if it were a physical machine, i.e., it's a computer within a computer. For example, in a system virtual machine, the virtual machine consists entirely of software; however, an operating system (or any application or process) running on the system VM has the perception of a CPU, memory, storage, as well as any other components that would exist in a physical computer. Software that is executed on a virtual machine is limited to the resources and abstract hardware that is provided by the virtual machine.

DETAILED DESCRIPTION

Figure 1:
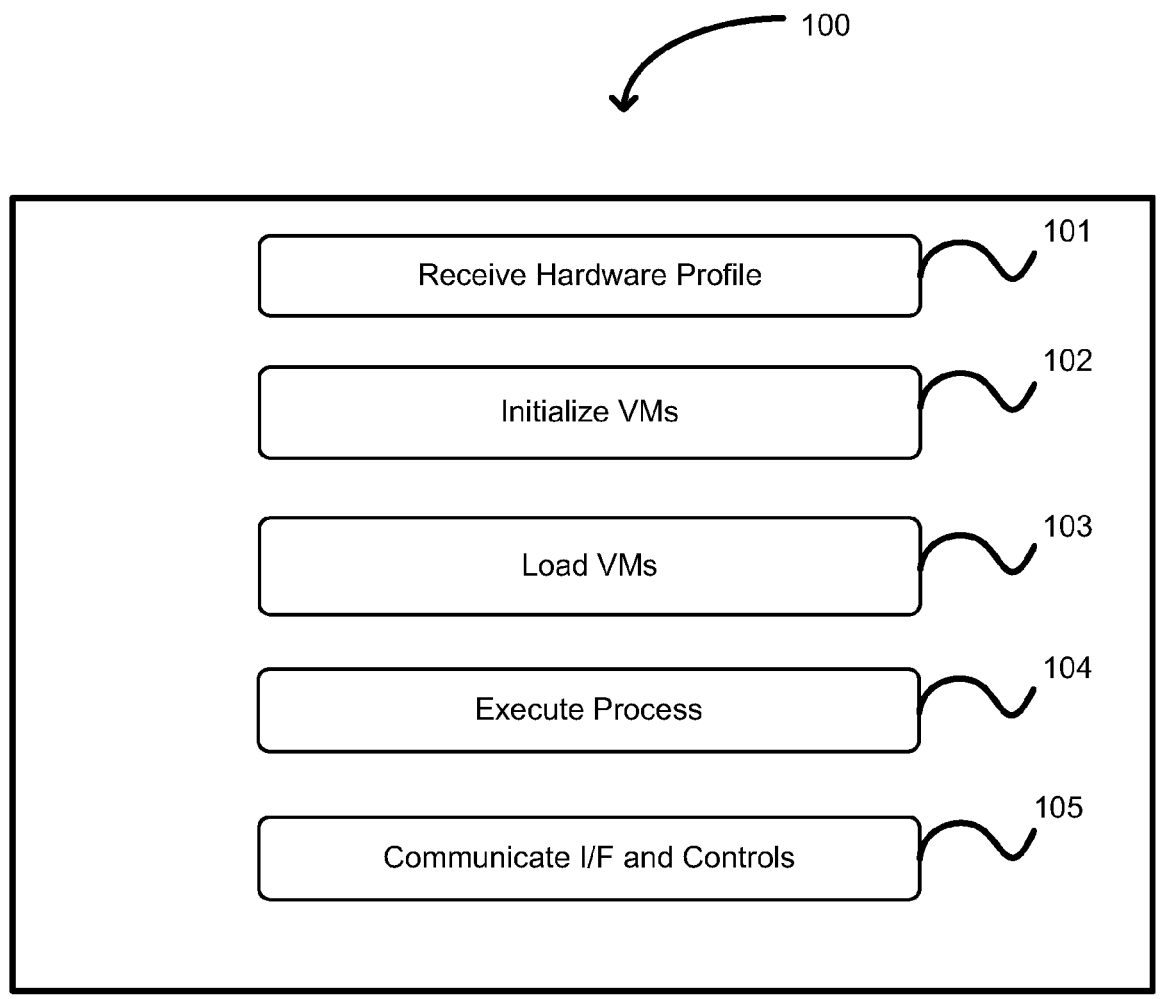
FIG. 1 is a functional block diagram of an exemplary system.

There is a need in the art for an efficient system and method for increasing the computational capabilities of mobile devices. Mobile devices include, but are not limited to, smartphones, tablets, net-tops and laptops and are capable of running many mobile operating systems, e.g., iOS, Android, Windows Phone, and traditional operating systems, e.g., Windows XP, Mac OS X, Linux, etc. In each instance, a mobile device is provided with a finite amount of memory and processing power. In most cases, the mobile device is configured by a large manufacturer, e.g., Motorola, Samsung, Apple, and it is not possible for a user to expand or upgrade the hardware specifications of the mobile device. Even in instances where memory or processing power can be upgraded, more capability is required by the user. Consequently, mobile devices have an upper limit to the number and complexity of tasks (software applications, processes, etc.) that can be executed by the device at any given time.

In view of the foregoing, it is desirable to increase capabilities so that one or more resource intensive software applications can be executed by or for the mobile device. Indeed, there is a boom of software applications being developed for mobile devices, and, with each subsequent software iteration, there is an increased need for processing power and/or memory. One of the bottlenecks is that software applications being prepared for execution on mobile devices are not designed to operate outside of the infrastructure/hardware constructs provided by mobile devices. Some software applications being developed do leverage the abilities of cloud based solutions; however, these applications simply outsource a particular task or logic to be executed by an outside system, but do not enhance execution of the software application itself.

Various embodiments of the present invention will be described in detail with reference to the drawings. Reference to various embodiments does not limit the scope of the invention, which is limited only by scope of claims attached hereto. Additionally, any examples set forth in this specification are not intended to be limiting and merely set forth some of the many possible embodiments. Also, it is to be understood that the phraseology and terminology used herein is for the purpose of description and should not be regarded as limiting. The use of "including", "comprising", or "having" and variations thereof herein is meant to encompass the items listed thereafter and equivalents thereof as well as additional items.

The disclosed embodiments are a method and system for leveraging the computational power of remote virtual machines for mobile device software applications and provide enhanced capabilities without incurring the cost of specially designed cloud-enabled software or hardware upgrades. The disclosed embodiments obviate the need (and costs) to procure a mobile device with greater physical hardware specifications. The disclosed embodiments enable existing software applications that have not been architected to leverage remote virtual machines or cloud computing architecture such that an end user can execute more applications and achieve greater scalability and capabilities for their mobile device.

By way of further example, the disclosed embodiments enable an enterprise environment to develop software applications for mobile devices that, to be run efficiently and/or effectively, require more resources than the currently deployed mobile devices provide. That is, implementation of the disclosed embodiments disassociate the resource needs of a particular application from the resources provided by deployed enterprise mobile devices.

FIG. 1 depicts an overall view 100 of an embodiment. In an embodiment, the system 100 receives a hardware profile from a mobile device, 101. The hardware profile may include the hardware specifications of the mobile device (i.e. memory, processor type) and/or any other attributes that define the constraints/features of the device (e.g. keyboard, touch screen, display resolution). Alternatively, the hardware profile may comprise hardware specifications that are greater than what is provided by the mobile device. For example, whereas a user may have an older generation mobile device, they may select a current generation mobile device for virtualization purposes. Further, the hardware profile is in no way limited by what mobile devices or specification options are currently on the market. By way of non-limiting example, a hardware profile may include an amount of memory (either RAM or HDD) or processor that is significantly greater than available on similar mobile devices, e.g. 128 GB RAM, latest Intel® chipset, or server-grade specifications.

The hardware profile may be generated by an application that is executed on the mobile device. By way of non-limiting example, the hardware profile may be generated by an application shell program that runs on the mobile device. A more detailed description of the application shell program is provided herein.

Upon receipt of the hardware profile 101, the system 100 may initialize one or more virtual machines 102. The virtual machines are configured and initialized in a manner that conforms with the hardware profile 101, as is understood by those skilled in the art. Further, the virtual machines may be initialized on the same system 100 or on a different system or server. For example, in a cloud computing environment, the virtual machines may be spread across disparate nodes, e.g., five virtual machines all located on different physical devices. The physical location of the node on which the virtual machine is initialized/run on does not impact the embodiments disclosed herein. As is also to be appreciated by those skilled in the art, initialization of a virtual machine does not necessarily mean that the virtual machine has been "started". Instead, it means only that resources for a particular virtual machine have been allocated by the system 100. For example, resources for a particular virtual machine may be allocated, but the virtual machine may not be run because no data has been loaded onto it yet. Alternatively, the virtual machine resources may be allocated to a resource pool, but pending further instructions for utilization.

As part of the initialization at Block 102, the system 100 creates or, alternatively, updates a virtual machine catalog (or table or any other data structure known in the art) and creates a dynamic link or mapping of each of the initialized virtual machines to the mobile device and/or user that requested the initialization. In each case, a unique ID is provided to identify each of the virtual machines and the mobile device and/or user requesting the resource.

In an embodiment, the system 100 may transmit the unique ID of a virtual machine to the application shell program for later reference. The unique ID may be used in all subsequent interactions to define the virtual machine resource sought to be utilized. Upon receipt of the unique ID, the application shell program may store the unique ID in its own virtual machine catalog (or table or any other data structure known in the art).

Referring to Block 103, the system 100 may receive from an application shell program a data backup of the mobile device. The data backup may comprise all of the data currently resident on the mobile device, including, but not limited to, file tables, file hierarchies, data files, image files, audio files, databases, operating systems, images of mobile device HDD, software application programs and any other data as is appreciated by those skilled in the art. The data backup of the mobile device may further include a unique ID for the virtual machine onto which the data backup is to be loaded.

Upon receipt of the data backup of the mobile device, the system 100 may check if the virtual machine corresponding to the unique ID is started. If the virtual machine is running, the system 100 passes the backup data (or a subset thereof) to the virtual machine. In an embodiment, the backup data may be first passed to a communications agent, which then restores the backup data to the virtual machine. If the virtual machine is not running, then it is started, and the backup data is passed on. In a further embodiment, the application shell program provides backup data to the system 100 on a periodic basis. In this embodiment, the periodic basis may be varied in accordance with the expected rate of change associated with the underlying data on the mobile device, which is contemplated herein to include both manual and automatic processes.

In a further embodiment, the system 100 may provide a pointer to backup data for the mobile device stored on a server or at another network location. For example, it may be desirable to utilize older backup data rather than the current version because of file corruption or changes to the underlying data.

Referring to Block 104, the system 100 may execute a process, wherein the process comprises an application or any piece of compiled source code. The process may be selected by a user via the application shell program. In an embodiment, the user may select a software application that has been loaded onto the application shell program on the mobile device for execution. The user may further select a virtual machine for executing the software application by way of the unique ID associated with the virtual machine.

Upon the user's selection of the application and instruction to execute, the system 100 receives the instruction and executes the software application on the designated virtual machine. In this example, the virtual machine has already been loaded with the backup data and is running. It is to be appreciated that these functions may occur in alternative timelines so as to reflect user preferences, e.g., select software application, load backup data onto virtual machine, execute software application on virtual machine.

Referring to Block 105, the system 100 may receive and transmit interface instructions and/or controls corresponding to a process or software application that has been executed on a virtual machine. In an embodiment, the system 100 communicates with a communications agent, wherein the communications agent communicates with the software application on the virtual machine through the application's native API, the operating system's API, screen mapping/control emulation or any other method known in the art. The communications agent may pass instructions to the software application and also receive data corresponding to the user interface of the application. The communications agent communicates interface and control data to the system 100 and the plurality of virtual machines.

In a further embodiment, the communications agent may route data corresponding to a software application based upon the unique ID of the virtual machine, as well as the name of the software application, an ID corresponding to the software application and/or an ID corresponding to an instance of the software application on the virtual machine.

Referring again to Block 105, the system 100 may receive and transmit interface instructions and/or controls directed to a process or software application that has been executed on a virtual machine. That is, in the case where a user has selected a process for execution by way of the application shell program, the application shell program may transmit the interface and/or control data corresponding to the user's interactions with the representation of the software application running on the virtual machine to the system 100.

Figure 2:
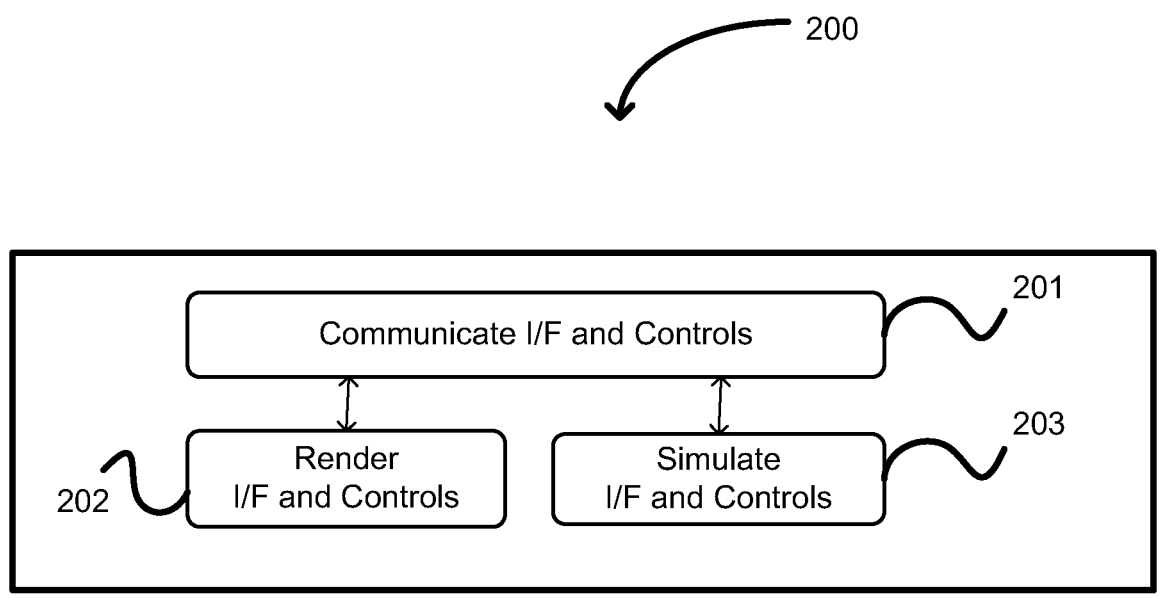
FIG. 2 is a functional flow block diagram of an exemplary system.

Now referring to FIG. 2, an embodiment of the communication system described above is provided, 200. In this embodiment, the communicate interface and controls module 201 comprises two related modules 202 and 203. The render interface and controls module 202 provides the function of transmitting and/or receiving data to the application shell program. In an embodiment, the system 100 transmits to the application shell program interface and control data corresponding to the interface and controls of the software application running on the virtual machine. This data may be provided in an intermediary format, i.e., a standardized format that is different than the native format of the software application. For example, one exemplary intermediary format is XML. Alternatively, if the software application is so enabled, the data may be provided in a native format instead of an intermediary format.

The application shell program may receive the intermediary format and utilize the instructions or parameters included therein to render the interface and controls of the software application running on the virtual machine on the mobile device. In an embodiment, the software application is a touch screen-enabled application and the corresponding interface and controls are displayed on the mobile device via the application shell program. The various methods of rendering an interface and controls are known by those skilled in the art. In an alternative embodiment the controls may be sensitive to keyboard input or other user input methods provided by the mobile device.

Referring to Block 203, the system 100 transmits to the virtual machine (which in an embodiment may be by a communications agent) the user's interactions with the rendered representation of the software application running. For example, the user's interactions with application shell program may be recorded, formatted to an intermediary format and then transmitted to the system 100. The system 100 then, in turn, may provide the interactions to the communications agent. The communications agent programmatically (i.e. via an API, system call, emulation method or any other means known in the art) simulates (or stimulates) the software application on the virtual machine in accordance with the user's interactions.

Figure 3:
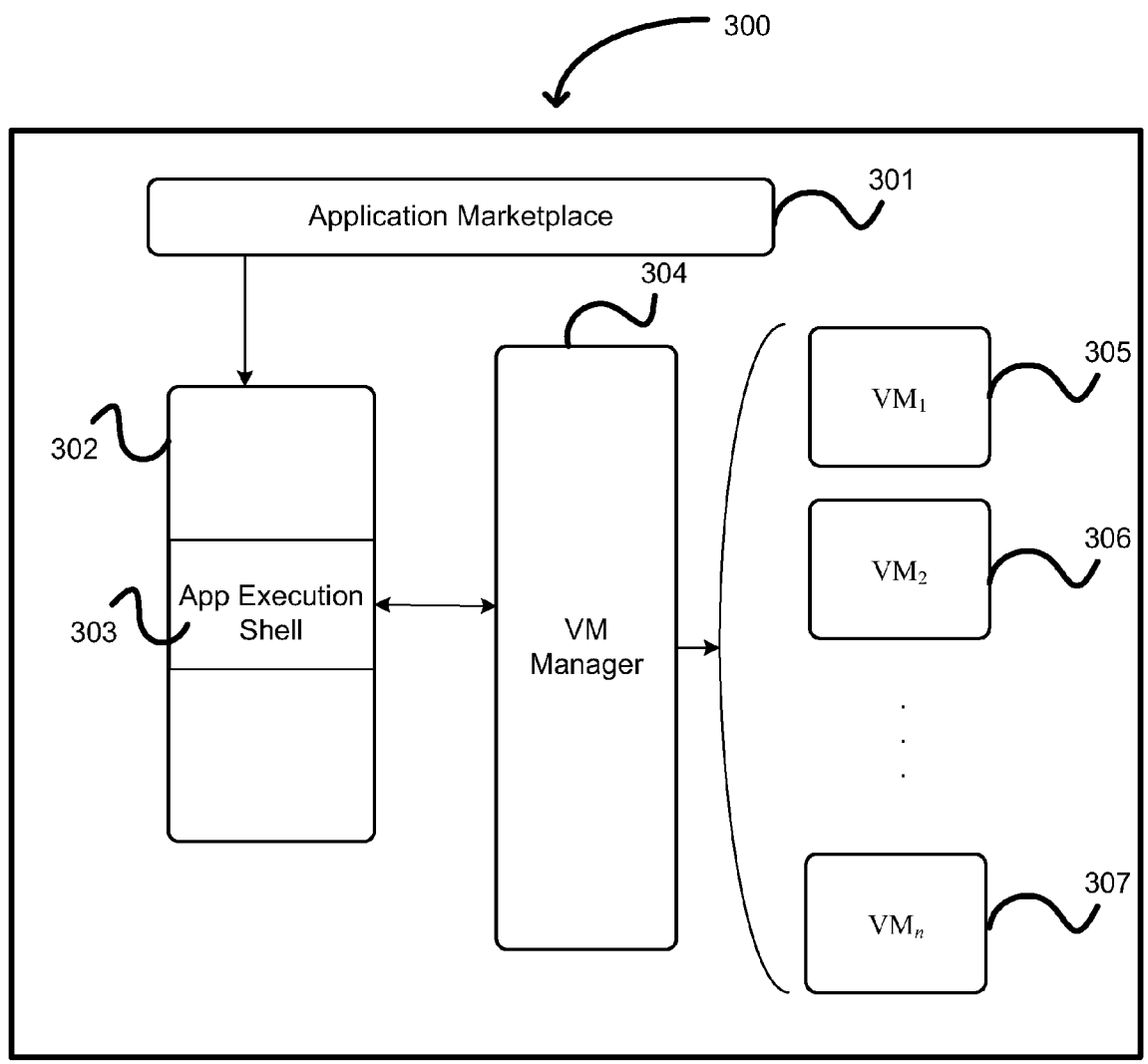
FIG. 3 is a functional flow block diagram of an exemplary system.

Referring to FIG. 3, in an embodiment, the mobile device is a Google® Android® smart phone 302. The software application sought to be virtualized is a third-party software application available via the Android® marketplace 301. The application shell program 303 has been installed onto the operating system of the smart phone 302. In this embodiment, the user may download the third-party application from the marketplace 301 and then load or otherwise cause to be linked the third-party application with the application shell program 303. In an embodiment, there may be a plurality of such third-party applications loaded with the application shell program 303.

Accessing the application shell program 303, the user may select one of the plurality of third-party applications for virtualization. The application shell program will transmit the ID information relating to a virtual machine and the software application to the system 100, 304, as well as any other relevant ID data as disclosed herein. In the case where the virtual machine 305, 306, 307 is not loaded or started, the system 100, 304 will transmit notifications to the user via the application shell program 303 that a virtual machine has not been loaded, that a mobile device backup data has not been loaded, and/or that a hardware profile has not been received, as appropriate.

Upon receiving instructions to execute a third-party application on a virtual machine, the system 100, 304 executes the third-party application on a virtual machine 305, 306 or 307. In an alternative embodiment, it may be desirable to execute multiple instances of the third-party application on a single or more than one virtual machine 305, 306, 307. Communication between the system 100, 304 may be accomplished via a communications agent. Once the third-party application is executed, the Android View object corresponding to the third-party application on the virtual machine 305, 306, 307 may be converted to XML by the communications agent or the system 100, 304. The system 100, 304 may then pass the XML representing the Android View object to the application shell program 303 on the smart phone.

Upon receiving the XML data corresponding to the Android View object for the third-party application, the application shell program 303 may inflate the XML data and the activities and control data contained therein, register for all of the events that are part the controls corresponding to the third-party application, and render the third-party user interface.

A user may interact with the user interface presented by the application shell program 303 for the third-party application. The user's interactions with this interface are received by the application shell program 303, wherein the application shell program 303 may receive interaction updates via subscribed services or any other means known in the art. The user's interactions may subsequently be transmitted to the system 101, 304 in the XML format, along with relevant ID data corresponding to the application, the application instance and/or the virtual machine on which the application is being executed. The system 101, 304 may transmit the received user interaction data to the virtual machine 305, 306 or 307 in such a manner that the user's interactions are simulated on the third-party application executed on the virtual machine 305, 306, 307.

Note, however, that the simulation (or stimulation) may be accomplished by the system 100, 304 itself or by a communications agent (which may incorporated in the system 100, 304 or reside on a separate system). As discussed herein, simulation (or stimulation) of the third-party application in accordance with the user's interactions may be accomplished programmatically or emulated by any means known in the art.

As is to be appreciated by those skilled in the art, the foregoing is not intended to limit the order by which the system 100, 304 operates, but to indicate one of many possible process strings enabled by the disclosure provided herein. For example, user interactions may be communicated to the system 100, 304 in real-time or near-real-time or with a known latency for purposes of buffering instructions to the software application. Similarly, communications to the virtual machine from the system 100, 304 may also vary in timeliness. In an embodiment, communication between the virtual machine, the system 100, 304 and the application shell program may be constant and in real-time (or near-real-time) so as to present a seamless user experience.

Figure 4:
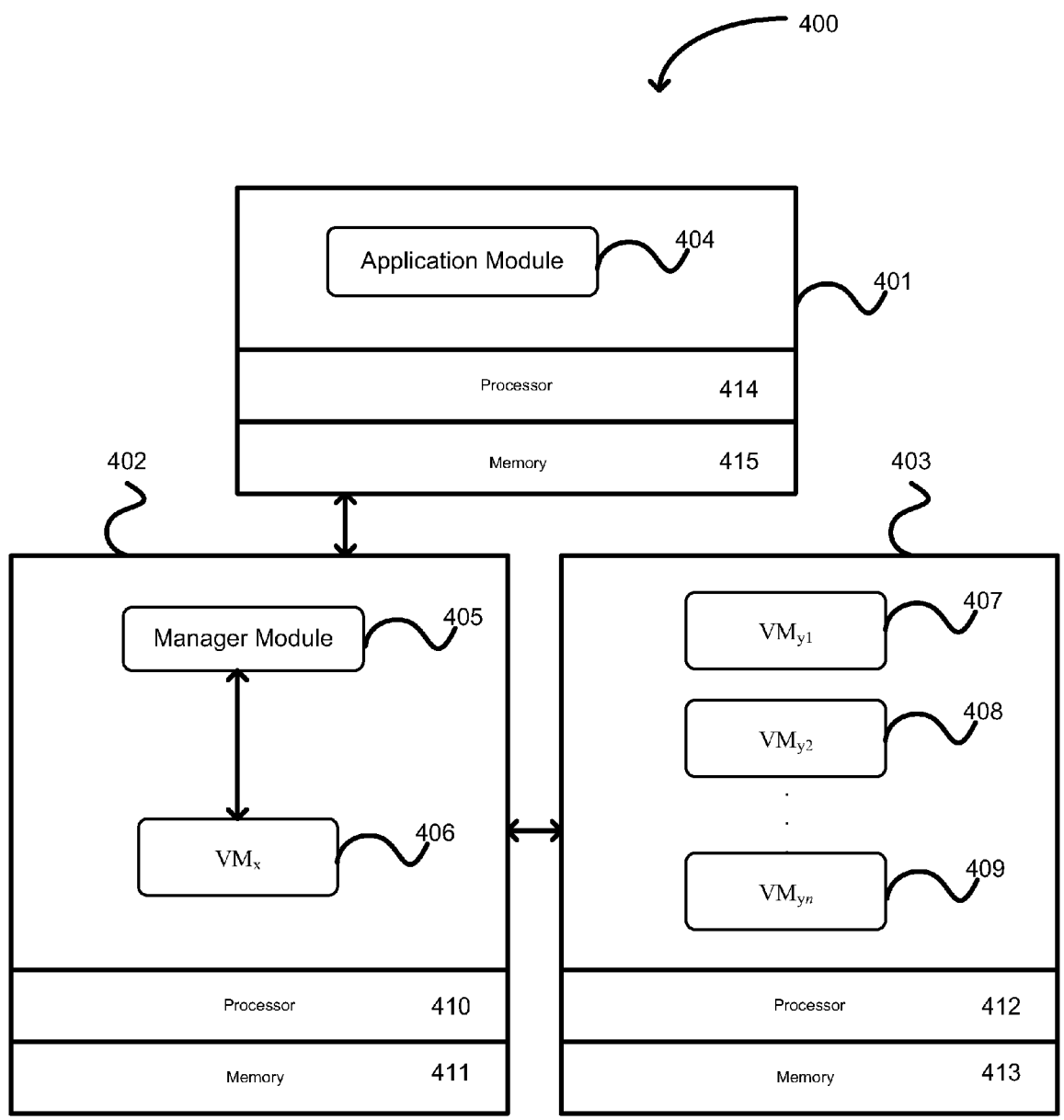
FIG. 4 is a functional flow block diagram of an exemplary system.

Referring to FIG. 4, a further embodiment 402 may include a computer having at least a processor 410 and memory 411 and a Manager Module 405 substantially corresponding to the system 100, 304. The embodiment 402 may further include one or more virtual machines 406 that are executed by the same processor 410. In an alternative embodiment, the one or more virtual machines 407, 408, 409 may be on a different processor 412, or multiple other processors, as is consistent with distributed cloud computing environments. Each of the processors 410, 412 may have different processing capabilities and different amounts of memory 411, 413. In an embodiment, the processors and memory may have specifications more advanced or capable than a mobile device 401. The mobile device may include a computer having at least a processor 414 and memory 415 and an application module substantially corresponding to the application shell program. 401, 402 and 403 may communicate with each other via any known wireless or wired data communication methodology known in the art.

The various modules consist of computer software code recorded on computer readable media and executed by a processor. The modules are segregated by function in this description for the purpose of clarity of description, but need not be discrete devices or code portions. The modules can be segregated or integrated in any manner. Various computer devices can be used to implement the embodiments, such as Servers, PCs, laptop computers, tablets, handheld computing devices, mobile devices or various combinations of such devices.

The embodiments described herein may be implemented via any appropriate computing environment, as understood by those skilled in the art. Further, the embodiments, in the cloud computing environment, may interface with application managers, or other software and interfaces, hardware or any other appropriate means for identifying a plurality of tasks and a plurality of nodes and/or for executing a plurality of tasks on a plurality of nodes.

What is claimed is:

1. A computer system for increasing the computational ability of a mobile device, the system comprising:
   one or more processors; and
   one or more memories operatively coupled to at least one of the one or more processors and having instructions stored thereon that, when executed by at least one of the one or more processors, cause at least one of the one or more processors to:
   receive, from the mobile device, a selection of a hardware specification, wherein the selected hardware specification corresponds to a device other than the mobile device and wherein the hardware specification is selected from a plurality of hardware specifications on an interface of the mobile device;
   initialize one or more virtual machines corresponding to the selected hardware specification;
   load a backup of the mobile device onto the one or more virtual machines, the backup comprising at least one computer program and data;
   execute the computer program on the one or more virtual machines; and
   exchange information relating to the execution of the computer program on the one or more virtual machines with the mobile device, such that the execution of the computer program is simulated on the mobile device.

2. The system of claim 1, wherein the instructions that, when executed by at least one of the one or more processors, cause at least one of the one or more processors to exchange information relating to the execution of the computer program further cause at least one of the one or more processors to:
   transmit a first set of interface and control data to the mobile device, wherein the interface and control data correspond to the interface and controls of the computer program executing on the one or more virtual machines;
   receive a second set of interface and control data from the mobile device, wherein the interface and control data correspond to a user's interactions with the interface and controls of the computer program as rendered on the mobile device; and
   input one or more instructions into the one or more virtual machines executing the computer program based on the second set of interface and control data.

3. The system of claim 1, wherein the hardware specification corresponds to a second mobile device.

4. The system of claim 1, wherein at least one of the one or more memories has further instructions stored thereon that, when executed by at least one of the one or more processors, cause at least one of the one or more processors to:
   assign a unique identifier to the one or more virtual machines;
   transmit the unique identifier to the mobile device; and
   receive a communication from the mobile device including the unique identifier, wherein the unique identifier is configured to route the communication to the one or more virtual machines.

5. The system of claim 1, wherein at least one of the one or more memories has further instructions stored thereon that, when executed by at least one of the one or more processors, cause at least one of the one or more processors to:
   assign a first unique identifier to the one or more virtual machines;
   assign a second unique identifier to the mobile device; and
   store a mapping of the first unique identifier to the second unique identifier, wherein information received from the mobile device is routed to the one or more virtual machines based on the mapping and wherein information generated by the one or more virtual machines is routed to the mobile device based on the mapping.

6. At least one non-transitory computer-readable medium storing computer-readable instructions that, when executed by one or more computing devices, cause at least one of the one or more computing devices to:
   receive, from a mobile device, a selection of a hardware specification, wherein the selected hardware specification corresponds to a device other than the mobile device and wherein the hardware specification is selected from a plurality of hardware specifications on an interface of the mobile device;
   initialize one or more virtual machines corresponding to the selected hardware specification;
   load a backup of the mobile device onto the one or more virtual machines, the backup comprising at least one computer program and data;
   execute the computer program on the one or more virtual machines; and
   exchange information relating to the execution of the computer program on the one or more virtual machines with the mobile device, such that the execution of the computer program is simulated on the mobile device.

7. The at least one non-transitory computer-readable medium of claim 6, wherein the instructions that, when executed by at least one of the one or more computing devices, cause at least one of the one or more computing devices to exchange information relating to the execution of the computer program further cause at least one of the one or more computing devices to:
   transmit a first set of interface and control data to the mobile device, wherein the interface and control data correspond to the interface and controls of the computer program executing on the one or more virtual machines;
   receive a second set of interface and control data from the mobile device, wherein the interface and control data correspond to a user's interactions with the interface and controls of the computer program as rendered on the mobile device; and
   input one or more instructions into the one or more virtual machines executing the computer program based on the second set of interface and control data.

8. The at least one non-transitory computer-readable medium of claim 6, wherein the hardware specification corresponds to a second mobile device.

9. The at least one non-transitory computer-readable medium of claim 6, further storing computer-readable instructions that, when executed by at least one of the one or more computing devices, cause at least one of the one or more computing devices to:
   assign a unique identifier to the one or more virtual machines;
   transmit the unique identifier to the mobile device; and receive a communication from the mobile device including the unique identifier, wherein the unique identifier is configured to route the communication to the one or more virtual machines.

10. The at least one non-transitory computer-readable medium of claim 6, further storing computer-readable instructions that, when executed by at least one of the one or more computing devices, cause at least one of the one or more computing devices to:

assign a first unique identifier to the one or more virtual machines;

assign a second unique identifier to the mobile device; and store a mapping of the first unique identifier to the second unique identifier, wherein information received from the mobile device is routed to the one or more virtual machines based on the mapping and wherein information generated by the one or more virtual machines is routed to the mobile device based on the mapping.

11. A method executed by one or more computing devices for expanding the computational capabilities of a mobile device, the method comprising:

receiving, by at least one of the one or more computing devices, from the mobile device, a selection of a hardware specification, wherein the selected hardware specification corresponds to a device other than the mobile device and wherein the hardware specification is selected from a plurality of hardware specifications on an interface of the mobile device;

initializing, by at least one of the one or more computing devices, one or more virtual machines corresponding to the selected hardware specification;

loading, by at least one of the one or more computing devices, a backup of the mobile device onto the one or more virtual machines, the backup comprising at least one computer program and data;

executing, by at least one of the one or more computing devices, the computer program on the one or more virtual machines; and exchanging, by at least one of the one or more computing devices, information relating to the execution of the computer program on the one or more virtual machines with the mobile device, such that the execution of the computer program is simulated on the mobile device.

12. The method of claim 11, wherein exchanging information relating to the execution of the computer program comprises:

transmitting a first set of interface and control data to the mobile device, wherein the interface and control data correspond to the interface and controls of the computer program executing on the one or more virtual machines;

receiving a second set of interface and control data from the mobile device, wherein the interface and control data correspond to a user's interactions with the interface and controls of the computer program as rendered on the mobile device; and inputting one or more instructions into the one or more virtual machines executing the computer program based on the second set of interface and control data.

13. The method of claim 11, wherein the hardware specification corresponds to a second mobile device.

14. The method of claim 11, further comprising:

assigning, by at least one of the one or more computing devices, a unique identifier to the one or more virtual machines;

transmitting, by at least one of the one or more computing devices, the unique identifier to the mobile device; and receiving, by least one of the one or more computing devices, a communication from the mobile device including the unique identifier, wherein the unique identifier is configured to route the communication to the one or more virtual machines.

15. The method of claim 11, further comprising:

assigning, by at least one of the one or more computing devices, a first unique identifier to the one or more virtual machines;

assigning, by at least one of the one or more computing devices, a second unique identifier to the mobile device; and storing, by at least one of the one or more computing devices, a mapping of the first unique identifier to the second unique identifier, wherein information received from the mobile device is routed to the one or more virtual machines based on the mapping and wherein information generated by the one or more virtual machines is routed to the mobile device based on the mapping.

* * * * *